(12) United States Patent
Tsuchimoto et al.

(10) Patent No.: US 6,336,202 B1
(45) Date of Patent: Jan. 1, 2002

(54) DATA STORAGE SYSTEM, STORAGE MEDIUM AND METHOD OF CONTROLLING A DATA STORAGE SYSTEM

(75) Inventors: Kazunari Tsuchimoto, Sagamihara; Kayo Takahashi, Fujisawa; Yuji Yokoe, Yokohama, all of (JP); Shigemi Suganuma, Campbell, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/149,535

(22) Filed: Sep. 8, 1998

(30) Foreign Application Priority Data

Sep. 8, 1997 (JP) ............................................. 9-242701

(51) Int. Cl.[7] ........................... G11C 29/00; G06F 12/00
(52) U.S. Cl. ............................ 714/768; 360/48; 360/53; 711/103; 711/105; 711/153
(58) Field of Search ................... 714/768, 52; 360/31, 360/48, 53, 58; 711/103, 105, 153, 204, 205, 206, 207

(56) References Cited

U.S. PATENT DOCUMENTS

| | | | |
|---|---|---|---|
| 5,933,852 A | * | 8/1999 | Jeddeloh ..................... 711/153 |
| 5,995,308 A | * | 11/1999 | Assouad et al. .............. 360/53 |
| 6,034,831 A | * | 3/2000 | Dobbek et al. ............... 360/53 |
| 6,055,204 A | * | 4/2000 | Bosshart ................ 365/230.06 |
| 6,085,339 A | * | 7/2000 | Jeddeloh ..................... 714/52 |

\* cited by examiner

*Primary Examiner*—Emmanuel L. Moise
(74) *Attorney, Agent, or Firm*—Abdy Raissinia; Bracewell & Patterson, L.L.P.

(57) ABSTRACT

A data storage system, a storage medium and a method of controlling a data storage system are described, which allow defects on a storage medium to be handled with a memory region of a reduced size. In one embodiment defective sectors are determined on a magnetic disk and recorded in a defect map as a starting address and a number (length) of consecutive defective sectors to more efficiently record defective sector bursts than in the prior art. Optionally a mixed format defect map may record defective sector bursts as above and single sector defects as an address without a number of consecutive defective sectors.

8 Claims, 6 Drawing Sheets

FIG. 2

| LEADING ADDRESS (2 BYTES) | LENGTH (1 BYTES) |
|---|---|
| 1 | 1 |
| 3 | 3 |
| 10 | 1 |
| ⋮ | ⋮ |
| ⋮ | ⋮ |

FIG. 3

| ABA | 0 | 1 | 2 | 3 | 4 | 5 | 6 | 7 | 8 | 9 | 10 | 11 |
|---|---|---|---|---|---|---|---|---|---|---|---|---|
|  |  | × |  | × | × | × |  |  |  |  | × |  |
| LBA | 0 | – | 1 | – | – | – | 2 | 3 | 4 | 5 | – | 6 |

FIG. 4

PRIOR ART

| LEADING ADDRESS (2 BYTES) |
|---|
| 1 |
| 3 |
| 4 |
| 5 |
| 10 |
| ⋮ |

FIG. 5

PRIOR ART

| LEADING ADDRESS (2 BYTES) |
|---|
| 1 |
| 3 |
| 10 |
| ⋮ |

| VIRTUAL Tr. No. | VTT |
|---|---|
| 0 | 00 |
| 1 | 03 |
| 2 | 03 |
| 3 | 06 |
| ⋮ | ⋮ |

| | (B) VST | (C) PSEUDO-LBA | (D) ABA |
|---|---|---|---|
| 0 | 0003h | 0000003h | 0000003h |
| 1 | 0003h | 0000003h | 0000004h |
| 2 | 0010h | 0000010h | 00000012h |
| 3 | 0007h | 0020007h | 002000Ah |
| 4 | 0100h | 0020100h | 0020104h |
| 5 | 0110h | 0020110h | 0020115h |
| 6 | 0045h | 0030045h | 003004Bh |
| ⋮ | ⋮ | ⋮ | ⋮ |

FIG.8

| LEADING ADDRESS | LENGTH | LEADING ADDRESS OF SUBSTITUTE SECTOR |
|---|---|---|
| 1 | 1 | 0000 |
| 3 | 3 | 0001 |
| 10 | 1 | 0004 |
| ⋮ | ⋮ | ⋮ |

| LEADING ADDRESS (2 BYTES) |
|---|
| 1 |
| 10 |
| ⋮ |

(B)

| LEADING ADDRESS (2 BYTES) | LENGTH (1 BYTE) |
|---|---|
| 3 | 3 |
| ⋮ | ⋮ |
| ⋮ | ⋮ |

DATA STORAGE SYSTEM, STORAGE MEDIUM AND METHOD OF CONTROLLING A DATA STORAGE SYSTEM

BACKGROUND OF THE INVENTION

1. Field of the Invention

The present invention relates to methods and means for a data storage system which allows defects in the storage medium to be avoided; and, more particularly, to a data storage system, a storage medium, and a method of controlling the data storage system, which allows a defect (or defect area) extending over a plurality of consecutive defective blocks (or burst defective blocks) to be dealt with in a memory region of a reduced size.

2. Background of the Invention

With recent improvements in the recording density of a disk storage medium in a disk drive unit, an increasingly severe demand is imposed upon the disk storage medium. Concomitantly, it is becoming difficult to manufacture a perfect storage medium which is flawless throughout a record region, and thus such storage medium could be obtained only at an expensive price. In a disk drive unit, if data cannot be read/written from/into a physical sector (or block) normally, this sector is recognized as a defective sector and recorded on (or entered in) a defect map. To give an actual example, a disk drive unit having a capacity of 2 G bytes is provided with a memory which contains a storage region corresponding to 2000 defective sectors in the form of a defect map.

Such defective sectors are detected during the manufacture of a storage medium or during low level formatting. During logical formatting, logical block addresses (LBAs) are allocated to normal sectors which are not recorded on the defect map.

In regard to defective sectors which are produced during the use of the disk drive unit, since LBAs have already been respectively allocated to these defective sectors by the logical formatting, these defective sectors are recorded on the defect map and these LBAs are respectively allocated to substitute sectors.

By not allocating the LBAs to the defective sectors but allocating them to the substitute sectors, data can normally be read/written without errors from/into the storage medium containing a degree of defects. This permits a yield of the storage medium to be improved and its cost to be reduced.

The number of the defects each composed of (or including or extending over) a plurality of consecutive defective sectors increases as a recording density is improved. To give an actual example of the disk drive unit, a ratio of a number of the defects each composed of an isolated single defective sector (referred to as "single-sector defect") to a number of the defects each composed of a plurality of consecutive defective sectors (referred to as "burst-sector defect") can be on the order of 3:7.

With regard to the burst-sector defects, if each of the defective sectors is recorded on the defect map, the redundancy is increased. Therefore, without reducing memory capacity, the number of the sectors which can be mapped out is not great.

To accommodate for this, there has been an attempt to record a defect in unit of a given number (a fixed length) of the sectors rather than record each of the defective sectors. This allows the burst-sector defects to be recorded on the defect map (referred to as "fixed-length defect map") efficiently, permitting the required memory capacity to be reduced.

However, if each defect is recorded in unit of a given number (a fixed length) of the sectors as mentioned above, it follows that a single-sector defects will also be recorded as a burst-sector defects having the fixed length, thus preventing an effective utilization of a record region on the storage medium. Specifically, after the logical formatting process, if each defect is treated as an unit of a plurality of defective sectors and substitute sectors on the memory are respectively allocated to the sectors in each defect, a lot of substitute sectors must be provided.

It is therefore an object of the present invention to provide a data storage system, a storage medium, and a method of controlling a data storage system, which allows a defect on a storage medium to be dealt with in a memory region of a reduced size.

SUMMARY OF THE INVENTION

A data storage system according to the present invention comprises, a storage medium having a record region which is blocked so as to include a plurality of blocks; a defective block recording means on which an address of a leading block of a defect area and length of the defect area are recorded; and a writing means for writing data into the plurality of blocks other than the block recorded on the defective block recording means.

Further, a storage medium according to the present invention comprises, a record region being blocked so as to include a plurality of blocks; and a defective block recording means on which an address of a leading block of a defect area and length of the defect area are recorded.

A method of controlling a data storage system according to the present invention comprises the steps of recording an address of a leading block of a defect area and length of the defect area, the defect area including at least one defective block; and writing data into the plurality of blocks other than the block recorded in the recording step.

BRIEF DESCRIPTION OF THE DRAWINGS

FIG. 2 illustrates an example of a variable-length defect map used in the disk drive unit according to the first embodiment of the present invention;

FIG. 3 illustrates an example of the defective sectors;

FIG. 4 illustrates an example of a single-sector defect map used in a conventional disk drive unit;

FIG. 5 illustrates an example of a fixed-length defect map used in another conventional disk drive unit;

FIGS. 6(A–D) is a diagram for explaining a method of representing the addresses in the variable-length defect map according to the first embodiment of the present invention;

FIG. 8 illustrates a second example of a variable-length defect map used in the disk drive unit according to the first embodiment of the present invention;

FIGS. 9A and 9B illustrates an example of a dual defect map including a single-sector defect map and a burst-sector defect map used in the disk drive unit according to a second embodiment of the present invention.

DESCRIPTION OF THE PREFERRED EMBODIMENTS

Figure 1:
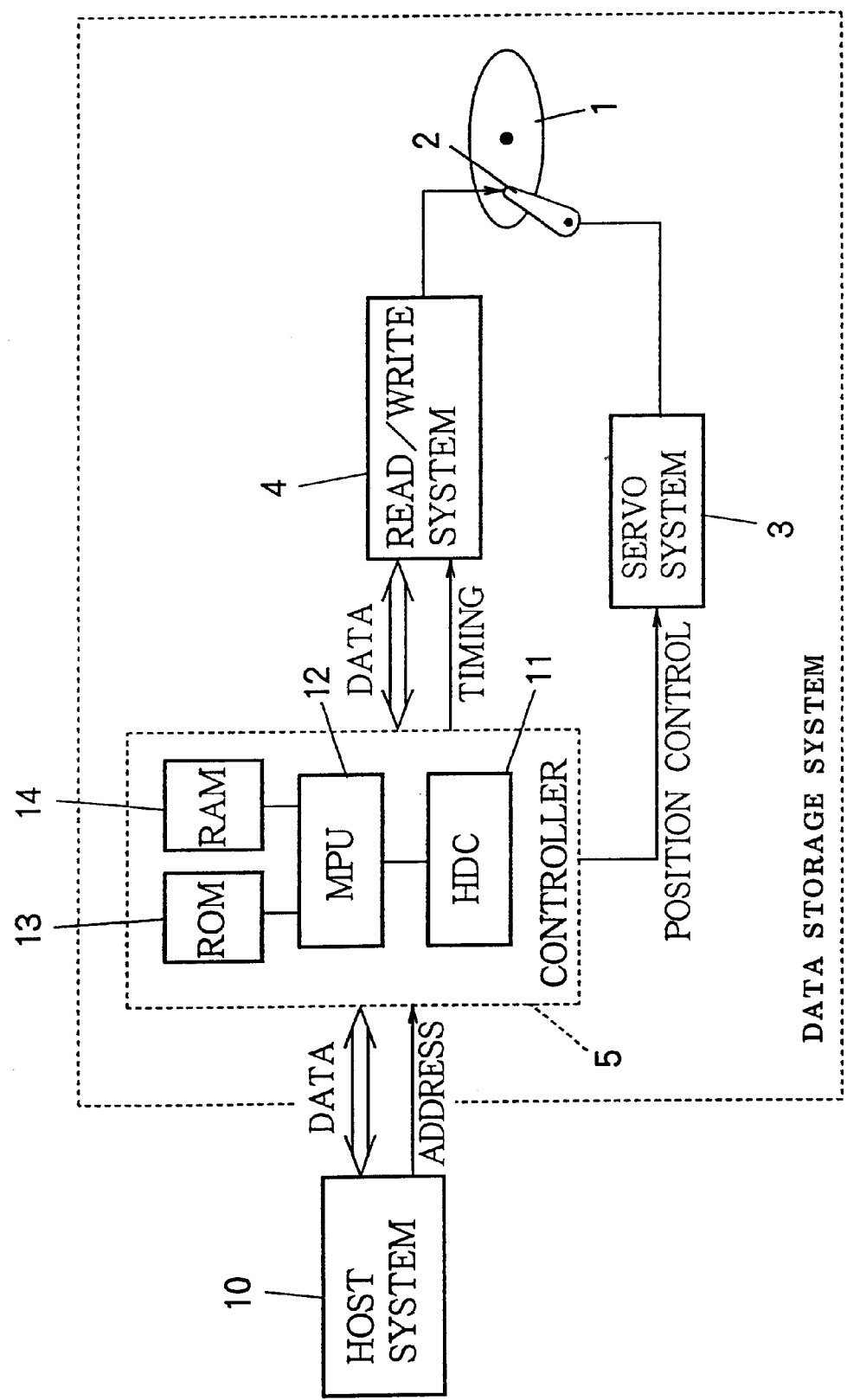
FIG. 1 is a block diagram showing a disk drive unit according to a first embodiment of the present invention.

FIG. 1 is a block diagram showing a disk drive unit according to a first embodiment of the present invention.

The disk drive unit has a magnetic disk 1 into which data is written, a head 2 which reads/writes data from/into the magnetic disk 1, a servo system 3 which controls a position of the head 2, a read/write system 4 which controls a data read/write operation performed by the head 2, and a controller 5 which controls a servo operation of the servo system 3, the data read/write operation, data input/output to/from a host system 10, and other operations.

Servo sectors are formed on a recording surface of the magnetic disk 1 at intervals of an established rotational angle, and physical sectors (blocks) are formed between adjacent servo sectors, respectively.

Further, the controller 5 has a hard disk controller (HDC) 11 which executes the servo control and so on, an MPU 12 which performs data processing such as a calculation of servo data to be used in the servo control and error processing, a ROM 13 which stores microprograms and data to be used for the operation of the MPU 12, and a RAM 14 in which data to be used with the servo control is stored or data to be read/written is cached.

The controller 5 is designed to execute a plurality of processes in parallel in accordance with the microprograms. One of the plurality of processes relates to a calculation to determine the servo data, which is executed every time a servo sector of the magnetic disk 1 is read. The other processes include a control over the input/output of commands and data with respect to a data processing system such as the host system 10, processing when an error occurs, read-cache processing in which data to be read for the host system 10 is read previously and stored in the RAM 14, and write-cache processing in which data stored in the RAM 14 is written into the magnetic disk 1.

Further, in the disk drive unit, each physical sector is examined to detect a defective sector during the manufacture of the disk or during the low level formatting. The defective sectors are recorded on a defect map (defective block recording means), and logical block addresses (LBAs) are allocated to the remaining normal sectors, respectively. The defect map may be recorded on a given region of the magnetic disk 1, for example. In operation, the MPU 12 (writing means) of the controller 5 operates to read the defect map from the magnetic disk and write it into the RAM 14, and commands a data read/write operation with respect to sectors to which LBAs are allocated by referring to the defect map in the RAM 14, respectively.

As shown in FIG. 2, the disk drive unit uses a variable-length defect map on which an address of a leading sector (also referred to as "leading address") of a defect (i.e., a defect area including an isolated single sector or consecutive sectors) and length of the defect are recorded. The variable-length defect map has a record region for 2000 defects (corresponding to 6000 bytes), for example. Each defect is recorded on the variable-length defect map as a set of two sections including a two-byte section on which each leading address of the defect is recorded as two-byte data and a one-byte section on which each length of the defect (i.e., the length of the single defective sector or a group of the consecutive defective sectors) is recorded as one-byte data.

FIG. 2 illustrates the variable-length defect map when the defective sectors have physical addresses (ABAs : absolute block addresses) of "1", "3", "4", "5" and "10", respectively, as indicated in FIG. 3.

Specifically, since an initial defect includes an isolated single defective sector having the address of "1" and the length of "1" are entered in the variable-length defect map. Further, since the next defect includes consecutive defective sectors having the addresses of "3" to "5", the leading address of "3" and the length of "3" are entered in the variable-length defect map in FIG. 3. Furthermore, since the following defect includes an isolated single defective sector having the address of "10", the leading address of "10" and the length of "1" are entered in the variable-length defect map.

In the conventional single-sector defect map (FIG. 4) on which respective defective sectors are recorded, since the length of a defect to be recorded is fixed to one sector length, only the leading address (represented as two-byte data) of the defective sector is recorded on the single-sector defect map. Consequently, when the defective sectors are present in a manner as illustrated in FIG. 3, the addresses of "1", "3", "4", "5" and "10" for five defective sectors are entered in the single-sector defect map.

Alternatively, the conventional fixed-length defect map (FIG. 5) which assumes a defect to have a given length, since the length of a defect to be recorded remains fixed to a predetermined number of sectors (five sectors, for example), only the leading address (represented as two-byte data) of the defect is entered in the fixed-length defect map. Consequently, when the defective sectors are present in a manner illustrated in FIG. 3, three defective sector groups having the leading addresses of "1", "3" and "10" for the respective defects are entered in the fixed-length defect map. In this instance, the LBAs are not assigned to twelve sectors having addresses from "1" to "7" (i.e., from "1" to "5" and from "3" to "7") and "10" to "14", making these sectors out of use (i.e., causing these sectors to be skipped out).

In the examples given above, the defects shown in FIG. 3 are recorded using ten bytes when the conventional single-sector defect map shown in FIG. 4 is utilized, and using six bytes when the conventional fixed-length defect map shown in FIG. 5 is utilized. In contrast, the defects shown in FIG. 3 are recorded using nine bytes when the variable-length defect map according to the first embodiment (FIG. 2) is utilized.

It will be understood that the single-sector defect map shown in FIG. 4 requires a record region corresponding to 2n bytes in order to record a defect including consecutive n sectors. By contrast, in the variable-length defect map which is consecutive n sectors) can be recorded as three-byte data. Thus it will be seen that the longer the length of a defect to increase the magnitude of n, the less the required amount of data per a defective sector becomes. In the example given above, a reduction in the amount of data achieved by using the variable-length defect map is only one byte (10%). However, in practice, there are many defects (defects of burst type) each including a plurality of consecutive sectors, and therefore the reduction in the amount of data used to record will become more significant. For example, the ratio of a number of the single-sector defects to a number of the burst-sector defects has been observed to be on the order of 3:7, as mentioned previously. When the variable-length defect map according to the first embodiment is used in such disk drive unit, the capacity required for the defect map can be reduced to the order of 50%, for example, as compared with the use of the single-sector defect map.

In the comparison of the above-mentioned defect maps, it would appear that a storage capacity required for the record of the defects will be at minimum when the fixed-length defect map is used, but large storage capacity for a plurality of records is required when the length of the defect exceeds the fixed length. With the variable-length defect map, a single entry is sufficient even in such instance, thus reducing the capacity required for the entry of the defects.

Further, when the conventional fixed-length defect map is used for recording the five defective sectors as shown in FIG. 3, twelve sectors are skipped out, thus preventing an efficient use of the record region on the magnetic disk 1. When the variable-length defect map according to the first embodiment is used for recording the five defective sectors shown in FIG. 3, only five sectors are skipped out, thus allowing an efficient use of the record region on the magnetic disk 1.

As described above, by using the variable-length defect map, the memory (RAM 14) capacity required for recording a burst-sector defect including a plurality of sectors can be reduced. As compared with the use of the fixed-length defect map, the variable-length defect map allows the efficiency of use of a record region on the magnetic disk to be improved.

In general, a physical address (ABA) representing a particular sector is required to be three or four bytes data. However, the address of each sector can be represented in two bytes by employing a technique mentioned below.

Specifically, assuming that there are virtual tracks each containing 65536 sectors, an address of a defective sector is identified by a combination of a virtual track and a virtual sector within the virtual track.

FIG. 6 is a diagram for explaining a method of representing the addresses in the variable-length defect map according to the first embodiment of the present invention. FIG. 6 includes A virtual track table (VTT) using two bytes per virtual track (FIG. 6(A)), a virtual sector table (VST) using two bytes per virtual sector (FIG. 6(B)) corresponding to the leading address in FIG. 5, and a sector length (corresponding to the length in FIG. 5) corresponding to each item in the VTT.

Virtual sector numbers of defective sectors are stored in the VST in ascending order of the ABAs. A number of the VST, where a smallest defective sector corresponding to the virtual track is stored, is stored in the VTT.

Values of the virtual tracks and the virtual sectors are determined from pseudo-LBAs shown in FIG. 6(C). Each presudo-LBA is equal to the ABA of a defective sector shown in FIG. 6(D) from which a number of the defective sectors preceding the present defective sector is subtracted. Thus pseudo-LBA corresponds to the LBA which is to be allocated to the sector provided that the present sector was not defective.

If the number of the virtual tracks is equal to 72, for example, a record region for the VTT requires a region of 144 bytes (=72×2 bytes). In addition, a record region for the VST and its associated length requires 6000 bytes (=2000×3 bytes) for 2000 defective sector groups having various lengths, for example.

By contrast, when each leading address of the defect is represented in four bytes for the defective map of the similar size, a record region of 10000 bytes (=2000×5 bytes) will be required. Accordingly, by constituting the variable-length defect map using the VTT and the VST, the required size of the variable-length defect map can be reduced, thus reducing the storage area which occupies part of the RAM 14 in the controller 5. Conversely, if the record region of the same capacity is assigned to the variable-length defect map, the number of the defective sector groups which can be recorded can be increased.

Figure 7:
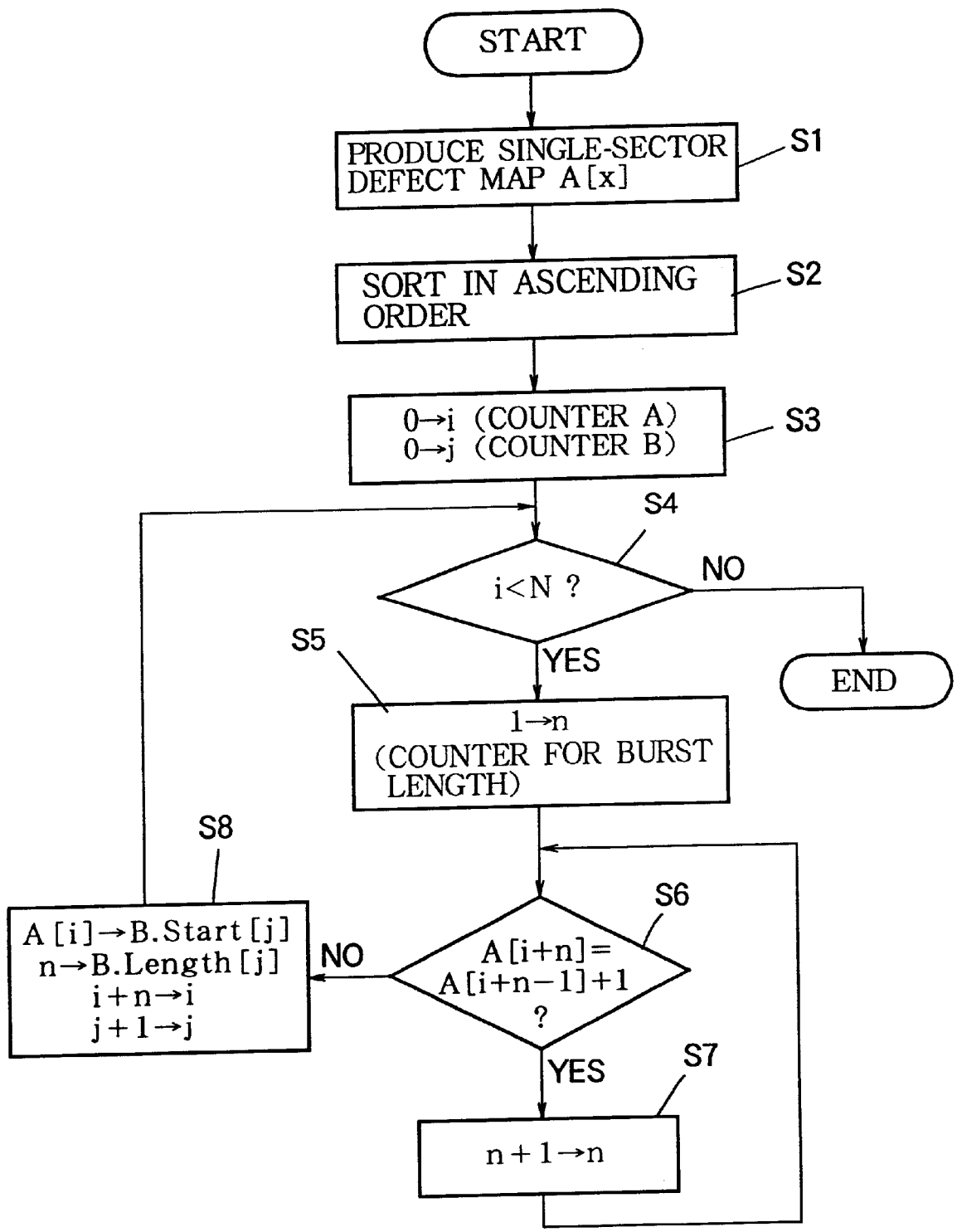
FIG. 7 is a flowchart showing a process of producing the variable-length defect map in the disk drive unit according to the first embodiment of the present invention.

Referring to FIG. 7, a process of producing the variable-length defective map will now be described.

During the manufacture of the magnetic disk 1 or during the low level formatting, at a step S1, individual sectors are checked to produce a preparatory single-sector defect map $\{A[x], x=0, 1, \ldots, N-1\}$ which is similar to the conventional one shown in FIG. 4.

After the preparatory single-sector defect map is produced, at a step S2, defective sectors recorded on the preparatory single-sector defect map are sorted in ascending order of the ABAs. Subsequently, at a step S3 and subsequent steps, the numbers of a single defective sector or consecutive defective sectors of the defects, i.e., the lengths of the defects indicated in FIG. 2 are obtained, and a variable-length defect map is produced.

Specifically, at the step S3, a value i of a counter A for the preparatory single-sector defect map and a value j of a counter B for the variable-length defect map are reset to 0. At the next step S4, it is determined whether or not the value i of the counter A is less than a number N of the elements in the preparatory single-sector defect map. If the value i of the counter A is not less than N, the process ends. However, if the value i of the counter A is less than N, the process proceeds to the step S5. At the step S5, a value n of a counter for burst length which is used to determine a burst length, i.e., the length of a defect, is set to 1, and the process proceed to the step S6.

At the step S6, it is determined whether or not an $(i+n)^{th}$ item A[i+n] in the preparatory single-sector defect map is equal to an $(i+n-1)^{th}$ item A[i+n-1] plus 1, namely, whether or not a sector which is recorded as the $(i+n)^{th}$ item is one which immediately follows the sector that is recorded as an $(i+n-1)^{th}$ item. If so, the process proceeds to the step S7 where the value n of the counter is incremented by 1, subsequently returning to the step S6. If not, the process proceeds to the step S8. At the step S8, an $i^{th}$ item A[i] of the preparatory single-sector defect map is entered to a leading address B.Start[j] of $j^{th}$ item in the variable-length defect map, and the value n of the counter is entered to the length of $j^{th}$ item in the variable-length defect map B.Length[j]. Subsequently, the value i of the counter A is incremented by n, and the value j of the counter B is incremented by 1, then returning to the step S4.

By repeating the steps S6 and S7, the length of a defect beginning with the $i^{th}$ item in the preparatory single-sector defect map is determined as the value n of the counter.

The above-described processing is executed by an examination unit and the like when it is executed during the manufacture of a magnetic disk, and is executed by the MPU 12 in the controller 5 when it is executed during the low level formatting. The resulting defect map represents the variable-length defect map, and recorded on a given region in the magnetic disk 1. In this manner, the variable-length defect map can be easily produced to permit a magnetic disk having an associated defect map to be used in a disk drive unit.

In the above description, the present invention has been applied to produce the defect map which allows a skip-out of defective sectors before LBAs are assigned during the logical formatting. However, the present invention is equally applicable to producing a defect map or a reassign table which is used to reassign a substitute sector for a sector which is found defective after the logical formatting. In this instance, a substitute sector or sectors are assigned in accordance with the leading address and the length of the defective sector or sectors.

Specifically, the reassign table comprises a leading address of a defect, its length, and a leading address of substitute sector or sectors as shown in FIG. 8. It will be understood that since the substitute sector or sectors are assigned in accordance with the length of the defect, the leading address of the substitute sector or sectors is incremented by a sum of lengths of previously occurring defects.

The reassign table is prepared by the MPU 12 and is stored in the RAM 14. Alternatively, the reassign table may be stored in a given region on the magnetic disk 1, and may be read out from it and written into the RAM 14 during the operation. When there is a demand from the host system 10 for an access to a sector or sectors which are recorded on the reassign table, the MPU 12 controls the servo system 3 and the read/write system 4 so that the access may be made to the substitute sector or sectors.

The distribution of the defective sectors varies from one storage medium to another storage medium. Accordingly, in some instance, a ratio of a number of the single-sector defects each composed of an isolated single defective sector may be high. If the variable-length defect map as mentioned above is used for such storage medium, there will be a need to provide an increased capacity as compared with a single-sector defect map by an amount corresponding to a record region which is used to store the length of each defect (block lengths). As a consequence, a number of the defective sectors which can be recorded on a memory having the same capacity will be reduced.

According to a second embodiment of the present invention, the variable-length defect map shown in FIG. 2 is replaced by a combination of a single-sector defect map shown in FIG. 9(A) and a variable-length defect map shown in FIG. 9(B). This combination is referred to as "dual defect map".

FIG. 9 illustrates a dual defect map on which the defects shown in FIG. 3 are recorded. Specifically, defective sectors having the addresses of "1" and "10", respectively, represent single-sector defects, and accordingly, only the addresses of "1" and "10" are entered in the single-sector defect map shown in FIG. 9(A). A defect beginning with a sector having an address of "3" and extending over three sectors represents a burst-sector defect extending over a plurality of defective sectors, and hence the address of "3" for the beginning sector of the defect and the length of "3" are entered in the variable-length defect map shown in FIG. 9(B).

Such dual defect map offers an advantage that the defects shown in FIG. 3, which required nine bytes for the entry to the variable-length defect map shown in FIG. 2, can be recorded using only seven bytes. Accordingly, the amount of data to be recorded on the dual defect map can be further reduced. This advantage becomes remarkable particularly for the magnetic disk 1 having an increased number of the single-sector defects. By way of example, where there are m single-sector defects, the required data storage can be reduced by m bytes as compared with the data storage required for the variable-length defect map shown in FIG. 2. As mentioned previously, the ratio of a number of the single-sector defects to a number of the burst-sector defects is on the order of 3:7. When the dual defect map as shown in FIG. 9 is used, the required capacity for the dual defect map may be reduced to the order of 40% of the required capacity for the single-sector defect map alone.

Figure 10:
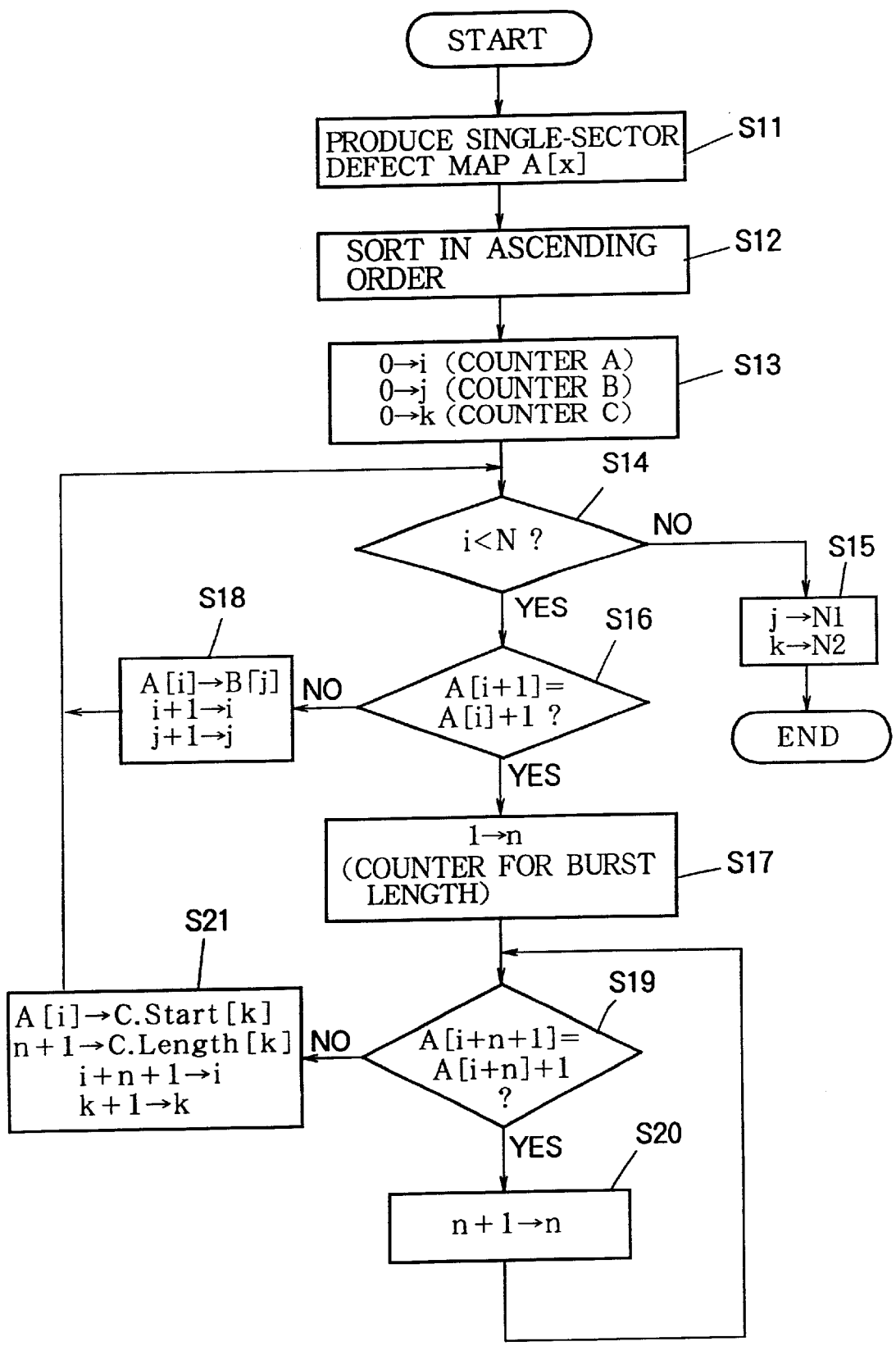
FIG. 10 is a flowchart showing a process of producing the dual defect map in the disk drive unit according to the second embodiment of the present invention.

Such dual defect map may be produced using the examination unit mentioned above or the MPU 12 by executing the following processing shown in FIG. 10, instead the processing illustrated in FIG. 7.

As shown in FIG. 10, initially at a step S11, individual sectors are examined in the similar manner as in the step S1 of FIG. 7, thus producing a preparatory single-sector defect map {A[x], x=0, 1, . . . , N−1}. After the preparatory single-sector defect map is produced, the defective sectors recorded on the defect map are sorted in ascending order of the ABAs at a step S12 in the similar manner as in the step S2.

Subsequently, the processing as indicated at a step S13 and subsequent steps is performed, thus classifying defective sectors recorded on the preparatory single-sector defect map into single-sector defects and burst-sector defects. In addition, the length of each burst-sector defect which extends over a plurality of sectors is determined.

Specifically, at the step S13, a value i of a counter A for the preparatory single-sector defect map, a value j of a counter B for a single-sector defect map as a part of the dual defect map, and a value k of the counter C for a variable-length defect map as a part of the dual defect map are reset to 0. At a next step S14, it is determined whether or not the value i of the counter A is less than the number N of items in the preparatory single-sector defect map. If the value is not less than N, the process proceeds to a step S15 where the value j of the counter B is set to the number N1 of items in the single-sector defect map B[y], and the value k of the counter C is set to the number N2 of items in the single-sector defect map C[z], whereupon the process ends.

On the other hand, if the value i of the counter A is less than N, the process proceeds to the step S16 where it is determined whether or not the $(i+1)^{th}$ item A[i+1] of the single-sector defect map is equal to the $i^{th}$ item A[i] plus 1, or whether or not the sector recorded as the $(i+1)^{th}$ item is one which immediately follows the sector that is recorded as the $i^{th}$ item. If not, the defect represents a single-sector defect, and accordingly, the process proceeds to the step S18 where the $i^{th}$ item A[i] of the preparatory single-sector defect map is entered into a $j^{th}$ item B[j] of the single-sector defect map and the values i and j of the counters A and B are incremented by 1, respectively, whereupon the process returns to the step S14. On the contrary, if so, the defect is a burst-sector defect, and then the length of the defect is determined by executing the step S17 and the subsequent steps. At the step S17, a value n of the counter which determines the burst length or the length of a defect is set to 1 whereupon the process proceeds to the step S19.

At the step S19, it is determined whether or not an $(i+n+1)^{th}$ item A[i+n+1] of the preparatory single-sector defect map is equal to an $(i+n)^{th}$ item A[i+n] plus 1, or whether the sector which is recorded as the $(i+n+1)^{th}$ item is one which immediately follows the sector that is recorded as the $(i+n)^{th}$ item. If so, the process proceeds to the next step S20 where value n of the counter is incremented by 1, subsequently returning to the step S19. If not, the process proceeds to the step S21 where the $i^{th}$ item A[i] of the preparatory single-sector defect map is entered into a leading address C.Start[k] of a $k^{th}$ item in the variable-length defect map, and the value n of the counter incremented by 1 or (n+1) is loaded into the length C.Length[k] of the $k^{th}$ item in the variable-length defect map. Subsequently, the value i of the counter A is incremented by (n+1) and the value k of the counter C is incremented by 1, whereupon the process returns to the step S14.

By repeating the processing indicated by the steps S19 and S20, the length of a defect beginning with $i^{th}$ item A[i] of the single-sector defect map is determined as a value n of the counter.

In this manner, the dual defect map comprising the single-sector defect map and the burst-sector defect map is produced as shown in FIGS. 9(A) and(B).

In the above-described embodiments, although the present invention as applied to a hard disk drive has been described, it should be understood that the application of the present invention is not limited to a hard disk drive, but is equally applicable to other type of disk storage medium such as magneto-optical disk, or any other storage medium having a record region which is blocked so as to include a plurality of blocks, for example, a memory device such as a flash memory.

EFFECT OF THE INVENTION

In accordance with the present invention, a leading address and length of a single defective block or consecutive defective blocks in a defect are recorded on the defective block recording means, and the writing means write data into the plurality of blocks other than a block recorded as a defective block on the defective block recording means, thus allowing defects on a storage medium to be dealt with using a memory capacity of a reduced size.

We claim:

1. A data storage system comprising:
   a storage medium having a region which includes a plurality of fixed length blocks;
   a defective block burst recording means which records an address of a first block of a defective area and a number of consecutive defective blocks in the defective area; and
   a writing means for writing data into the plurality of blocks other than the blocks in the defective area.

2. A data storage system according to claim 1, further comprising
   means for determining single defective block having no consecutive defective block; and
   a single defective block recording means for recording the address of the single defective block without recording a number of consecutive defective blocks for the single defective block.

3. A data storage system according to claim 1, wherein the storage medium comprises a disk storage medium.

4. A data storage system according to claim 1, wherein the storage medium comprises a memory device.

5. A method of controlling a data storage system, the data storage system having a storage medium having a plurality of blocks, the method comprising the steps of:
   recording in a first location an address of a starting block of a defective area and length of the defect area, the defect area including at least one defective block; and
   writing data into the plurality of blocks other than defective blocks recorded in the recording step.

6. A method of controlling a data storage system according to claim 5, wherein the recording step includes the steps of:
   determining a defect area which is contained in a single defective block; and
   recording the address of the single defective block in a second location reserved for single defective block addresses.

7. A storage system comprising:
   a storage medium that includes
      a recording region with a plurality of fixed length blocks; and
      a defective block burst map on which an address of a starting block of a defective area and a number of blocks of consecutive defective blocks is recorded.

8. A storage system according to claim 7, wherein the storage medium further includes a map of addresses of single defect blocks having no consecutive defective block.

* * * * *